Patented Apr. 11, 1944

2,346,202

UNITED STATES PATENT OFFICE 2,346,202

PRODUCTION OF ISOCYANIC ACID ESTERS

Ernst Waltmann and Edgar Wolf, Krefeld, Germany, assignors to Heberlein Patent Corporation, New York, N. Y., a corporation of New York No Drawing. Application August 10, 1939, Serial No. 289,394. In Germany February 19, 1936

5 Claims. (Cl. 260—404)

This invention relates to the production of isocyanic acid esters.

This application is a continuation-in-part of our copending application Serial No. 126,521, filed February 18, 1937, now Patent No. 2,173,029, granted September 12, 1939.

We have found in accordance with our invention a process for producing an isocyanic acid ester which comprises, heating an amide of the formula R.CO.NH$_2$ with phosgene, CO.Cl$_2$, or the corresponding bromine compound, or phosgene producing substances, to produce a carbamic acid chloride, R.CO.NH.CO.Cl, where R is a member selected from the group consisting of an alkyl, cycloalkyl, and aralkyl radical, said alkyl radical containing at least 10 carbon atoms, and removing hydrochloric acid from the said carbamic acid chloride by treatment with calcium oxide or similar oxide to form the corresponding isocyanate.

The principal object of the present invention accordingly is to provide simple efficient processes for the manufacture of such compounds.

The invention comprises the novel processes and steps of processes according to which such products are manufactured, the specific embodiments of which are described hereinafter by way of example and in accordance with which we now prefer to practice the invention.

We have found, in accordance with our invention, that amides may be converted in the presence of phosgene, or the corresponding bromine compound, directly into the corresponding carbamic acid chloride in accordance with the following reaction—

R.CO.NH$_2$+CO.Cl$_2$→R.CO.NH.CO.Cl which is then converted into the corresponding isocyanate by treatment with calcium oxide or similar oxide to remove HCl.

Substances which we have successfully made in accordance with our invention include the following:

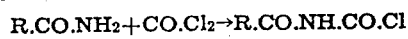

Stearic acid isocyanate
Palmitic acid isocyanate
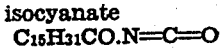

Phenyl stearic acid isocyanate

The following are specific examples for making substances and carrying out the processes of the invention as we now prefer to practice it. These examples are for illustrative purposes and the invention is not to be considered as limited thereto except as indicated in the appended claims.

Examples 1. 250 parts by weight of stearic acid amide are dissolved in 700 parts by weight of toluene, 80 parts by weight of pyridine and 100 parts by weight of phosgene are added. The mixture is heated in an autoclave to 150° C. for three hours. Stearic acid carbamic acid chloride

is obtained. The corresponding isocyanate

is obtained by dissolving the acyl carbamic acid chloride in benzene and heating it with calcium oxide.

2. 280 parts by weight of stearic acid amide are dissolved in 2500 parts by weight of carbon tetrachloride, 100 parts by weight of perchloroformicacidmethyl-ester Cl.CO$_2$C.Cl$_3$ are added. The mixture is heated for 24 hours to 60° C. Stearic acid carbamic acid chloride

is obtained. This is then converted into the corresponding isocyanate by treatment with lime, as in Example 1, to convert the carbamic acid chloride into the corresponding isocyanate.

When the expression "phosgene" is employed in the appended claims, it is intended to refer not only to phosgene COCl$_2$, but also to phosgene-producing substances such as "Perstoff" which is perchloroformicacidmethyl-ester Cl.CO$_2$.C.Cl$_3$.

The processes of the invention particularly as set forth in the specific embodiments above can be carried out with simple apparatus at relatively small expense and in a relatively short time.

While the invention has been described in detail according to the preferred manner of carrying out the process, it will be obvious to those skilled in the art after understanding the invention, that changes and modifications may be made therein without departing from the spirit or scope of the invention.

What is claimed as new and desired to be secured by Letters Patent, is:

1. A process for producing an isocyanic acid ester which comprises heating an amide having the formula $R.CO.NH_2$ with phosgene to produce a carbamic acid chloride having the formula $R.CO.NH.CO.Cl$, where R is a member selected from the group consisting of an alkyl, cycloalkyl, and aralkyl radical, said alkyl radical containing at least 10 carbon atoms, and removing hydrochloric acid from the said carbamic acid chloride by treatment with an alkali to form the corresponding isocanate.

2. A process in accordance with the process of claim 1 in which the alkali is calcium oxide.

3. A process for producing an isocyanic acid ester which comprises heating an amide having the formula $R.CO.NH_2$ with phosgene to produce a carbamic acid chloride having the formula $R.CO.NH.CO.Cl$, where R is $C_{17}H_{35}$, and removing hydrochloric acid from the said carbamic acid chloride by treatment with calcium oxide to form the corresponding isocyanate.

4. A process for producing an isocyanic acid ester which comprises heating an amide having the formula $R.CO.NH_2$ with phosgene to produce a carbamic acid chloride having the formula $R.CO.NH.COCl$, where R is $C_{15}H_{31}$, and removing hydrochloric acid from the said carbamic acid chloride by treatment with calcium oxide to form the corresponding isocyanate.

5. A process for producing an isocyanic acid ester which comprises heating an amide having the formula $R.CO.NH_2$ with phosgene to produce a carbamic acid chloride having the formula $R.CO.NH.CO.Cl$, where $R$ is $C_8H_{17}.CH.phenyl.(CH_2)_8$, and removing hydrochloric acid from the said carbamic acid chloride by treatment with calcium oxide to form the corresponding isocyanate.

ERNST WALTMANN.
EDGAR WOLF.

Certificate of Correction

Patent No. 2,346,202. April 11, 1944.

ERNST WALTMANN ET AL.

It is hereby certified that errors appear in the printed specification of the above numbered patent requiring correction as follows: Page 1, first column, lines 46 to 51 inclusive, strike out the following formula:

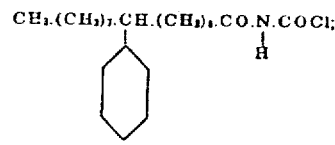

page 2, first column, line 16, claim 1, for "isocanate" read —*isocyanate*: and that the said Letters Patent should be read with these corrections therein that the same may conform to the record of the case in the Patent Office.

Signed and sealed this 23rd day of May, A. D. 1944.

[SEAL]

LESLIE FRAZER,
*Acting Commissioner of Patents.*